United States Patent [19]

Fryer et al.

[11] Patent Number: 4,493,108
[45] Date of Patent: Jan. 8, 1985

[54] VIDEO IMAGE FIELD CUT PROCESSING

[75] Inventors: George B. Fryer, Mint Hill; David A. Stepneski, Cabarrus County, both of N.C.

[73] Assignee: International Business Machines Corp., Armonk, N.Y.

[21] Appl. No.: 454,582

[22] Filed: Dec. 30, 1982

[51] Int. Cl.³ .............................................. G06K 9/20
[52] U.S. Cl. ........................................ 382/61; 382/48
[58] Field of Search .............. 382/61, 48, 9; 358/280, 358/257

[56] References Cited

U.S. PATENT DOCUMENTS

| Re. 29,104 | 1/1977 | Shepard | 382/61 |
|---|---|---|---|
| 3,763,467 | 10/1973 | Cash et al. | 382/61 |
| 4,300,123 | 11/1981 | McMillin et al. | 340/146.3 Z |
| 4,346,405 | 8/1982 | Yoda et al. | 358/105 |

Primary Examiner—Leo H. Boudreau
Assistant Examiner—Michael Murray
Attorney, Agent, or Firm—Bell, Seltzer, Park & Gibson

[57] ABSTRACT

Video image data received from an optical document reading system is processed by a dynamic field cut technique which utilizes the scan line as its elemental unit of data in controlling the concurrent extraction and processing of the individual fields. The field cut technique of the present invention has a chain of control instructions with a series of pointers being utilized to control the sequential processing of the control instructions and permit bypassing the control instructions for fields for which processing has been completed. By this arrangement, the number of operations necessary to separately act on a plurality of independently defined fields is reduced.

10 Claims, 6 Drawing Figures

VIDEO IMAGE FIELD CUT PROCESSING

BACKGROUND OF THE INVENTION

This invention relates to the processing of data from an image system, and more particularly to the processing of digital image data received from an optical document reading system.

Documents which are processed by an optical document reading system typically have one or more areas or "image fields" at various locations on the document which contain information, such as printed or written alphabetic or numeric characters for example. The document reading system scans the document and converts the information on the document into an output stream of digital image data.

The output data stream from the image system consists of equal size picture elements or PEL's corresponding to the digital video output from an optical scanner. The data stream is usually divided into scan lines consisting of a fixed number of PEL's. A common set of connected PEL's is referred to as an image field. A rectangular image field is completely defined by the index or value of the first and last scan lines, and the beginning and ending PEL locations.

In the past, a major problem of document image processing has been the high costs associated with handling and buffering of binary images. This is because the image fields of a document are typically extracted and placed in a buffer in their entirety before they are processed.

The present invention provides a dynamic field cut technique which utilizes the scan line as its elemental unit of data in controlling the concurrent extraction and processing of the individual image fields. This technique provides substantial savings in data handling and buffering costs over conventional field cut methods.

SUMMARY OF THE INVENTION

To efficiently process a document sequentially, its format for all image fields is defined in advance. The field cut function of the present invention utilizes a series or chain of control instructions to control the extraction of these image fields on a scan line by scan line basis.

The term "control instruction" as used herein, refers to instructions or information which defines each field and specifies the functions to be performed on each scan line of image data as presented. A separate control instruction is provided for each image field on the document. The control instructions are arranged in a chain or series ordered in the sequence of their contained initial scan line numbers. For the control instruction of each field there are two pointers maintained in the chain which correspond to the next field to be processed (i.e. a forward pointer) and the previous field (i.e. a rearward pointer). The forward pointers link the chain in the order in which image fields appear. The rearward pointers enable changing of a forward pointer so as to bypass an intermediate control instruction once the field it relates to has been completely processed.

A pointer to the first field in the chain and a current field pointer are also maintained. The current field pointer is set equal to the first field pointer prior to processing each sequential scan line. As a scan line is received from the video system, its index or scan line number is compared with the first scan line of the current (first) field. If this scan line number is less than the value of the first scan line, then this scan line is not part of this field. Because of the ordering of all fields, it will be understood that this scan line cannot belong to any other field defined in the chain, and processing of this particular scan line is terminated and the next scan line is processed.

If the current scan line number is greater than or equal to the value of the first scan line of the current field, then a field has been located and processing can be performed on the appropriate PEL's of that scan line according to the specified function definition for that field. Processing continues for each scan line in the field until the current field is completed.

When all processing for a field is completed, the control instruction for that field is removed from the chain. This is accomplished by changing the forward pointer of the control instruction of the previous (still active) field and the rearward pointer of the control instruction of the next active field. Thus, an intermediate instruction is bypassed once the field it relates to has been completely processed. This arrangement limits the number of operations necessary to separately act on a plurality of independently defined fields.

Restated broadly, the present invention is directed to an image processing system for dissecting into predetermined fields image data received from a document, and comprises:

means for receiving a series of scan lines of image data which collectively represent an image source area, said receiving means including means for identifying a sequence of numbers for each scan line of the series, means for storing, at a plurality of memory addresses, a series of control instructions, one instruction for each field of image data to be processed from within the image source area, each of said control instructions comprising a forward pointer to the control instruction for the next field to be processed, a rearward pointer to a prior control instruction in the series, an initial scan line number, and a function controller for specifying the functions to be performed on the image data, said series of control instructions being initialized such that the instructions in said series are ordered in the sequence of their contained initial scan line numbers, and means operative upon receipt of each scan line by said receiving means for:

(a) accessing the first of said control instructions, (b) comparing the scan line sequence number of the scan line presented with the initial scan line number of the accessed control instruction and terminating processing of the presented scan line if said initial scan line number is greater than said presented scan line sequence number, otherwise (c) performing the function specified by said function controller of the accessed control instruction, (d) accessing by use of the forward pointer of the accessed control instruction, a further control instruction, and (e) repeating operations (b) through (d) until processing of the presented scan line is terminated.

In a further aspect of the invention, each control instruction of said series includes information by which the completion of processing of the associated field can be determined, and wherein the system further comprises means responsive to the completion of processing of a field associated with one control instruction for accessing, by use of the rearward pointer of said one control instruction, a prior control instruction, and for substituting the forward pointer from said one control instruction for the forward pointer of said prior control instruction, and substituting the rearward pointer from said one control instruction for the rearward pointer of the control instruction of the next active field, whereby subsequent processing of said series of control instructions will effectively bypass said one control instruction.

From the foregoing, it will be seen that the present invention provides a significant savings of video buffering by allowing the dynamic processing of image fields. Processing is optimized since only those image fields associated with the current scan line are processed. A further optimization is attained by allowing an early removal of an image field from the chain of instructions as determined by more sophisticated tests performed within the field function. The definition of complex fields is possible with no restrictions on overlapping fields or field shapes. The same PEL could exist in more than one field and be processed by different functions as required. This is particulary useful where both image capture and character recognition functions are to be performed on overlapping fields.

BRIEF DESCRIPTION OF THE DRAWINGS

Some of the features and advantages of the invention having now been described, others will become apparent from the detailed description which follows, when taken in connection with the accompanying drawings, in which.

DESCRIPTION OF AN ILLUSTRATIVE EMBODIMENT

Figure 1:
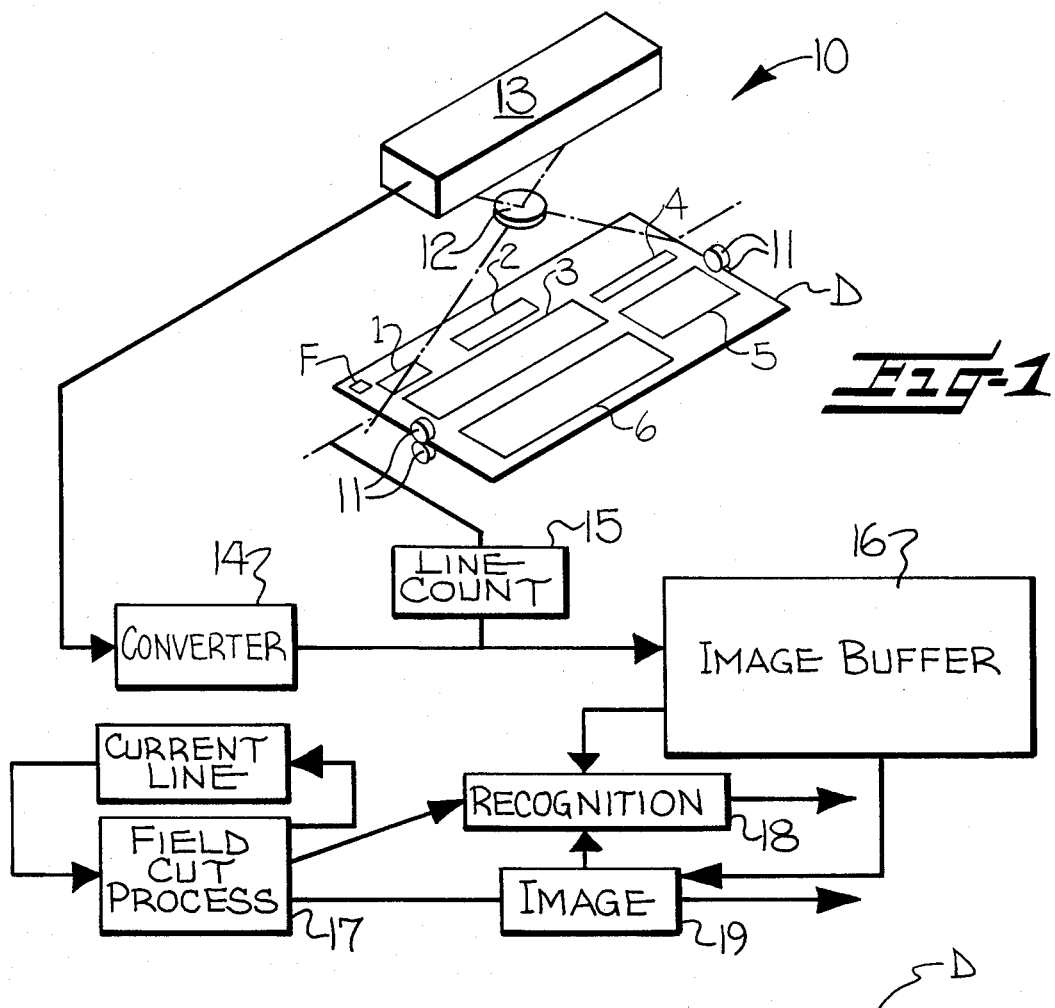
FIG. 1 is a schematic perspective view showing an optical reading system and the associated elements utilized in the image processing system of the present invention.

Referring now more particularly to FIG. 1, the reference character 10 generally indicates an optical scanner, of known construction and operation, adapted for scanning and reading on a line-by-line basis information printed or written in selected areas or image fields of a document D. The optical scanner device 10 has a predetermined field of view extending widthwise of the document D in the form of a narrow line, and suitable means, such as drive rolls 11, are provided for advancing the document D through the field of view of the scanner device. As the document passes through the field of view of the scanner, it is scanned and read as a succession of closely arranged widthwise extending scan lines. The pattern of light and dark images present on the document D within the field of view of the scanning device is focused by a lens 12 onto a photodetecting device 13. The photo-detecting device converts the pattern of light and dark images into electrical signals defining a series of successively arranged picture elements or PEL's which collectively constitute the scan line. The signals are then processed by a suitable signal converter 14, such as an A to D converter, into a digital data signal describing each PEL of the scan line.

The optical scanner 10 is also provided with means for counting the number of lines which have been scanned in a document and for providing a data signal representing the sequence number of each scan line. This is schematically illustrated in FIG. 1 by the line counter 15. As the document is successively scanned by the optical scanner device 10, the image data for each scan line, obtained from the signal processor 14, together with the sequence number for each scan line, as determined by the line counter 15, is stored in a buffer memory 16. The buffer 16 may have a capacity for storing as many as several hundred scan lines of image data at any given time, with successive new scan lines being overwritten into locations previously occupied by earlier scan lines for which processing has been completed.

Image data for individual image fields of the document is extracted and processed under the control of the field cut function of the present invention, as schematically indicated at 17, with various operations being performed on the extracted data, such as for example character recognition, as indicated at 18, or image capture as indicated schematically at 19.

Figure 2:
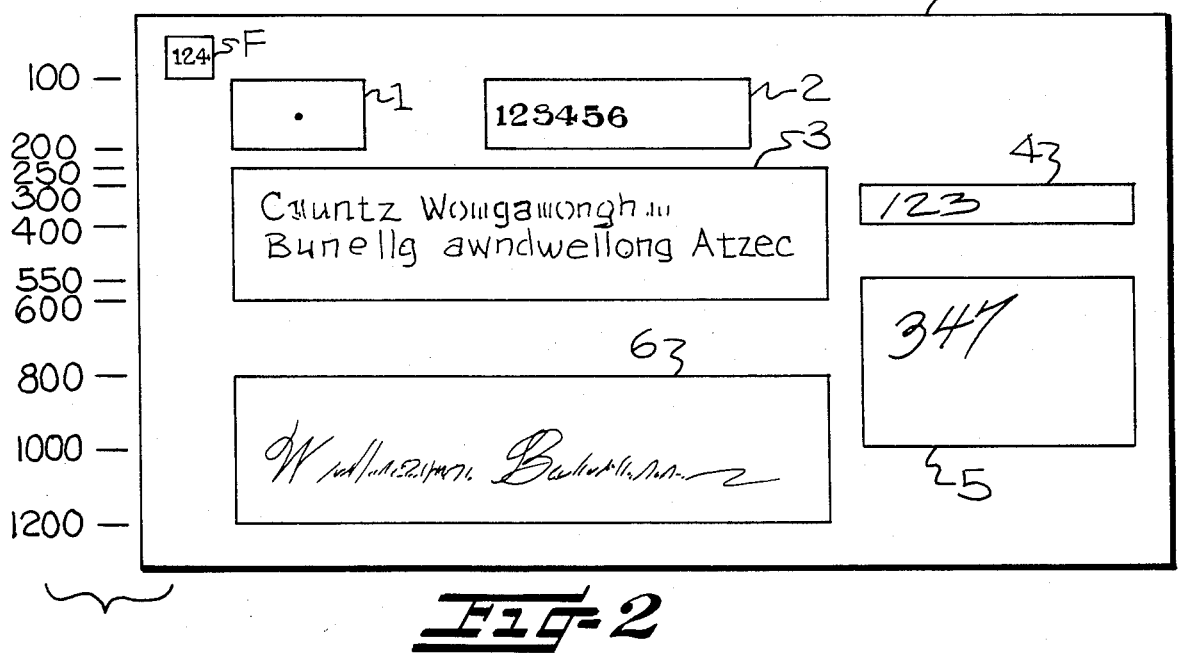
FIG. 2 is a plan view illustrating a document with various fields of information thereon.

FIG. 2 illustrates in more detail a representative document D which may be processed in accordance with the present invention. The document illustrated contains six areas or image fields, identified by the reference characters 1 to 6 respectively, which are of varying sizes and which are located at various locations on the document D. Additionally, the document contains a format field area, identified by the reference character F. While the image fields are represented in the drawing by boxes, it will be understood that the document need not necessarily contain printed boxes identifying the respective image fields, although in some instances this may be desirable. Contained within each of the image fields 1 to 6 are various types of printed or handwritten information which is to be optically scanned and processed. Thus, for example, in the illustrative document D, field 1 contains a sense mark, such as a darkened box, at a predetermined location, while field 2 contains preprinted numbers. Field 3 contains two lines of printed alphabetic characters, while fields 4 and 5 contain handwritten numeric characters. Field 6 may, for example, contain a handwritten signature.

The numbers shown along the left hand side of the document represent the scan line numbers for this document. Thus for example, fields 1 and 2 begin at scan line 100 and end at scan line 200. Field 3 begins at scan line 250 and ends at scan line 600. Field 4, which is fully overlapped by field 3, begins at scan line 300 and ends at scan line 400. Field 5 begins at scan line 550 and ends at scan line 1,000, while field 6 begins at scan line 800 and ends at scan line 1,200, thus partially overlapping field 5. It is to be understood that the number of the image fields, and their locations and sizes may vary, substantially without restriction as to location, size or whether one image field overlaps another.

To facilitate processing different types of documents with differing image field arrangements, each document is uniquely identified by a format identification number, in the instance of the illustrated document, the format number being 124. This format number is located at a predetermined field location on the document where it can be recognized by character recognition logic.

When a document is initially processed, the format identification field is scanned and the format identification number contained therein is recognized. This information enables the system to create, from prestored information, a particular chain of control instructions associated with that particular document format. This chain of control instructions is stored at predetermined memory addresses, and contains specific information for controlling the process of each field of the document. Each control instruction for each field includes information which defines the starting and ending locations of the field on the document, information designating the functions to be performed on the image data for the field, and pointers which identify the next field to be processed (i.e. a forward pointer) and the previous field (i.e. a rearward pointer). The chain of instructions also includes a pointer to the first field in the chain and a pointer to the current field.

Figure 3:
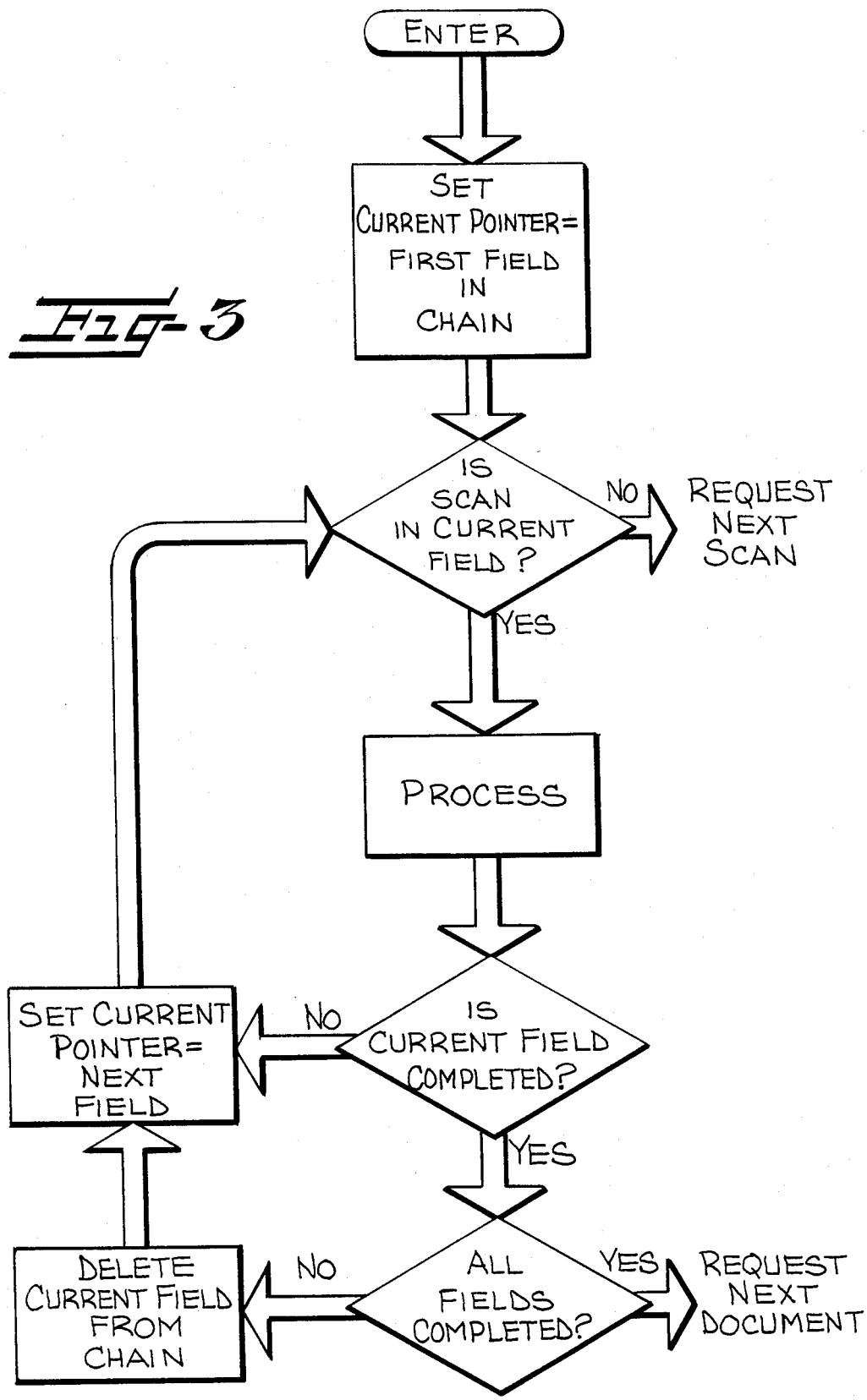
FIG. 3 is a schematic flow chart illustrating the sequence of operations carried out in the processing of image data obtained from the document in accordance with the present invention.

The operations which are carried out for each sequential scan line in accordance with the present invention will be understood more fully from the flow chart of FIG. 3. As illustrated, prior to the processing of each sequential scan line, the current field pointer is set equal to the first field in the chain of instructions. Then, a comparison is made to determine whether the scan line being processed is in the current field. This is accomplished by comparing the value of the scan line with the value for the first scan line of the current field. If the current scan line number is less than the first scan line number for the field, then processing of the scan line is terminated and the next scan line is read. If the scan line is greater than or equal to the scan number for the current field, then that scan is processed in accordance with the stored function definition for that field. Various processing functions may be carried out, such as, for example, character recognition, image capture, rotation, blankout, etc.

After processing of the scan line for a given field, a determination is made whether the current field is completed. This may be accomplished, for example, by comparing the value of the current scan line number with the value for the last scan line of the current field. If the current scan line number is equal to the last scan line number for the field, then processing of that field is terminated. Alternatively, the particular processing function which is being carried out for the current field may determine that the current field is completed prior to reaching the last scan line for the field. For example, the character recognition function may determine that a character has been completely read and recognized and that no further characters may be expected to be found for the remaining scan lines of the current field. In this instance, the character recognition function itself may determine that the current field is completed.

If the current field is not completed, the current pointer is set equal to the next field, and then, by reiterating the above described steps, a comparison is made to determine if the current scan line is in that field, and processing proceeds accordingly.

If it is determined that the current field is completed, the next step is to determine whether all fields have been completed, which would occur if the next field pointer of the current field is equal to zero and the last field pointer of the current field is equal to zero. If all fields are not completed, the field just completed is immediately removed from the chain so that further processing steps will bypass the control instructions for that field. Removal of a particular field from the chain is accomplished by changing the value of the forward pointer of the last (previous) field to the value of the forward pointer of the field to be deleted, and changing the value of the rearward pointer of the next active field to the value of the rearward pointer of the field to be deleted. When all fields have been completed, the next document may be processed.

Figure 4:
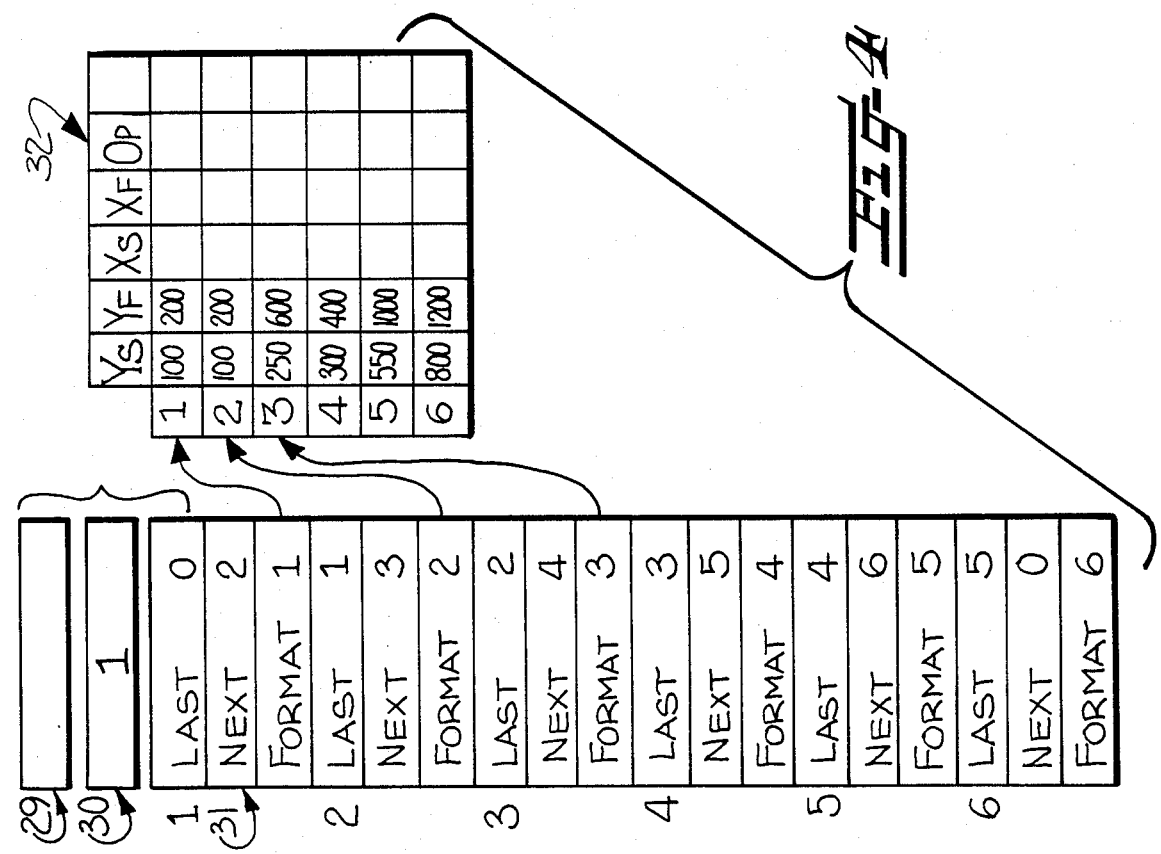
FIG. 4 is a block diagram schematic illustration of a series of control instructions for processing the data.

Referring now to FIG. 4, the box indicated by the reference character 29 represents a memory location containing the address of the current field, i.e. a "current field pointer". The box 30 represents a memory location containing a memory address or pointer for the starting or first field. The value of the starting field pointer at the beginning of processing is set equal to the memory address of the control instruction for the first field of the document, in this instance 1. The box indicated by the reference character 31 schematically represents a plurality of memory locations in which is stored the chain of control instructions for the illustrative document format number 124. The subboxes labeled "LAST" and "NEXT" represent the rearward and forward pointers respectively. The subboxes labeled "FORMAT" represent other control information or instructions for each respective field. The "FORMAT" information may, if desired, be stored in successive memory addresses in the chain of control instructions 31. Preferably however, and as illustrated in FIG. 4, the pertinent information for each field is stored in a table at another location in memory. The box indicated by the reference character 32 schematically represents such a table in which there is stored for each field 1 to 6, the starting scan line number $Y_s$, the final scan line number $Y_f$, the starting PEL location of the field $X_s$, the final PEL location of the field $X_f$, and a function controller OP which indicates the particular function to be carried out for that field. The table 32 may optionally include additional information as necessary or desirable. It will be understood that when the pertinent field information and instructions is stored in a static table 32, the subboxes labeled "FORMAT" in the chain of control instructions 31 comprise pointers to the appropriate memory addresses in the table 32.

FIG. 4 illustrates how the chain of control instructions 31 would appear at the beginning of processing of the document and during the scanning of each scan line from 1 to 200. As illustrated, the starting field pointer has a value of 1, the address of the control instruction for the first field to be processed. As each scan line is received, its scan line number is compared to the first scan line $Y_s$ of the current field (field 1) identified by the pointer "Format 1". For each of scan lines 1 to 99, the current scan line number will be less than the first scan line (100) of the current field (field 1) and processing terminates and the next scan line is read. At scan line 100, since the current scan line is equal to or greater than 100, processing of that scan line takes place in accordance with the function definition for that field. Processing then continues to the next control instruction in the chain, that for field 2. The current scan line number is again compared to the value of the first scan line for that field (field 2). Since the current scan line is equal to or greater than 100 (the value of the first scan line for field 2), that scan line is processed in accordance with the function definition for field 2. Processing then continues for the next control instruction in the chain, field 3. The current scan line number is compared to the first scan line number for field 3 (250), and since the current scan line number is less than 250, the scan is not in that field, processing terminates and the next scan line is processed. Since the chain of instructions 31 is ordered in the sequence of the first appearance of scan lines, then if the current scan line value is less than the value of the first scan line number of the current field, that scan line could not belong to any other field in the chain. Thus, unnecessary processing is avoided.

At the beginning of processing for scan line 200, the starting field pointer 30 is equal to 1, the address of the first field to be processed. Processing of the scan line takes place in accordance with the function definition OP for field 1. Upon completion of processing, the current scan line value is compared to the final scan line $Y_f$ for field 1, and it is determined that field 1 has been completed. Immediately, field 1 is removed from the chain. This is accomplished by referring to the rearward pointer of the current field to locate the previous field processed, and changing the value of the next field pointer to that of the current field. In this instance, the previous field was the starting address in location 30, and its value is changed to 2. Processing then continues for the next field in the chain, field 2. After the scan line has been processed in accordance with the function definition for field 2, a similar test is made to determine if field 2 has been completed. Since field 2 has also been completed, field 2 is removed from the chain by changing the starting field pointer 30 to 3.

Figure 5:
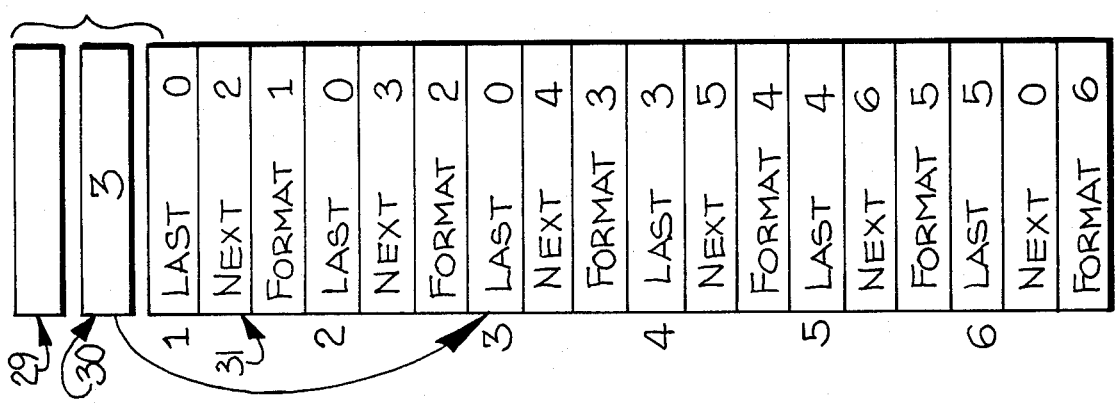

Thus, after scan line 200 has been processed, the chain of instructions would appear as illustrated in FIG. 5, and it will be seen as each scan line thereafter is processed, the sequential execution of the control instructions in the chain bypasses the control instructions for fields 1 and 2.

Figure 6:
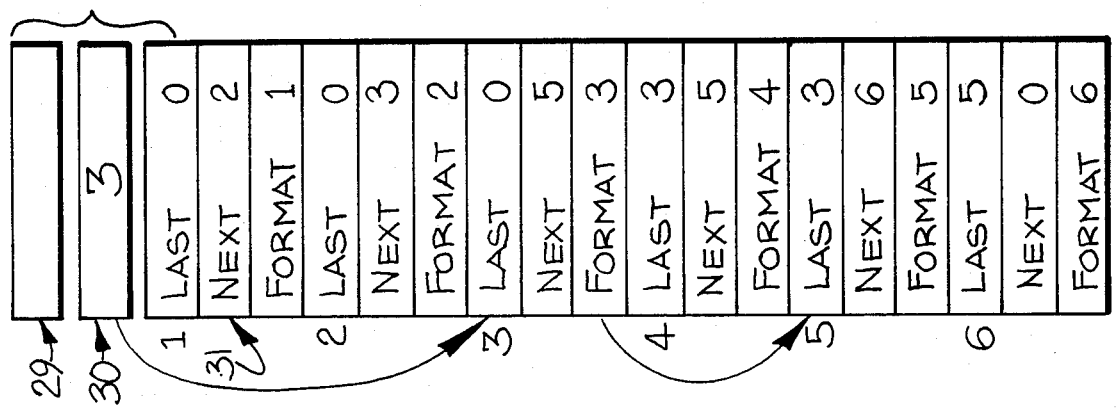
FIGS. 5 and 6 are block diagram schematic illustrations of the control instructions as they appear at various stages during the processing of successive fields of the document.

Referring back to FIG. 2, it will be seen that as the scan lines are sequentially processed, at some point field 4 will be completed before field 3 is completed. This will occur, at the latest, upon processing of scan line 400, although the particular function controller for field 4 may determine that field 4 has been completed prior to reaching scan line 400. In either event, when it is determined that field 4 has been completed, the control instruction for field 4 is immediately removed from the chain. This is accomplished by changing the NEXT value of the last (previous) field to the NEXT value of the field to be deleted. Additionally, the LAST value of the next active field in the chain is changed to the LAST value of the field to be deleted. Thus, as shown in FIG. 6 the field to be deleted is field 4, and the forward pointer (NEXT) of field 3 is changed to the NEXT value of field 4, and the rearward pointer (LAST) of field 5 is changed to the value (3) of the LAST pointer of field 4. From then on, field 4 is effectively bypassed when the series of control instructions is executed.

In a similar manner, the control instructions for the other fields in the document are removed from the chain. It will thus be seen how the series of control instructions dynamically changes as the successive scan lines of a document are read, with the control instructions for completed fields being promptly removed from the chain of instructions to optimize processing.

In the drawings and specification, there has been set forth an exemplary embodiment of the invention. It should be understood that while specific terms are employed, they are used in a generic and descriptive sense only and not for purposes of limitation.

That which is claimed is:

1. An image processing system for dissecting into predetermined fields image data received from a document, comprising:
   means for receiving a series of scan lines of image data which collectively represent an image source area, said receiving means including means for identifying a sequence number for each scan line of the series,
   means for storing, at a plurality of memory addresses, a series of control instructions, one for each field of image data to be processed from within the image source area,
   each of said control instructions comprising a forward pointer to the control instruction for the next field to be processed, a rearward pointer to a prior control instruction of the series, an initial scan line number, and a function controller for specifying the function to be performed on the image data,
   said series of control instructions being initialized such that the instructions in said series are ordered in the sequence of their contained initial scan line numbers, and
   means operative upon receipt of each scan line by said receiving means for:
   (a) accessing the first of said control instructions,
   (b) comparing the scan line sequence number of the scan line presented with the initial scan line number of the accessed control instruction and terminating processing of the presented scan line if said initial scan line number is greater than said presented scan line sequence number, otherwise
   (c) performing the function specified by said function controller of the accessed control instruction,
   (d) accessing by use of the forward pointer of the accessed control instruction, a further control instruction, and
   (e) repeating operations (b) through (d) until processing of the presented scan line is terminated.

2. An image processing system as defined in claim 1 wherein each of the control instructions of said series includes information by which the completion of processing of the associated field can be determined, and wherein the system further comprises
   means responsive to the determination of the completion of processing of a field associated with one control instruction for accessing, by use of the rearward pointer of said one control instruction, a prior control instruction, and for substituting the forward pointer from said one control instruction for the forward pointer of said prior control instruction, whereby subsequent processing of said series of control instructions will effectively bypass said one control instruction.

3. An image processing system as defined in claim 2 wherein said means responsive to the determination of the completion of process of a field associated with one control instruction additionally includes
   means for substituting the rearward pointer from said one control instruction for the rearward pointer of the control instruction of the next active field.

4. An image processing system as defined in claim 2 wherein said information by which the completion of processing of the associated field can be determined comprises the final scan line number for the associated field, and including means for comparing the scan line number of the scan line presented with said final scan line number of the associated field.

5. An image processing system as defined in claim 2 wherein said information by which the completion of processing of the associated field can be determined is operatively associated with the function controller for the respective field for effecting determination of the completion of processing of the field when the function specified by the function controller is carried out.

6. An image processing system comprising:

means for optically scanning an image source area of a document and producing a series of scan lines of image data which collectively represent the image source area, means for successively receiving the respective scan lines of image data and for storing the same with an associated identifying sequence number for each scan line of the series, means for storing, at a plurality of memory addresses, a series of control instructions, one for each field of image data to be processed from within the image source area, each of said control instructions comprising a forward pointer to the control instruction for the next field to be processed, a rearward pointer to a prior control instruction in the series, an initial scan line number, a function controller for specifying the function to be performed on the data, and information by which the completion of processing of the associated field can be determined, said series of control instructions being initialized such that the instructions in said series are ordered in the sequence of their contained initial scan line numbers, and means operative upon receipt of each scan line by said receiving means for:

(a) accessing the first of said control instructions,
(b) comparing the scan line sequence number of the scan line presented with the initial scan line number of the accessed control instruction and terminating processing of the presented scan line if said initial scan line number is greater than said presented scan line sequence number, otherwise
(c) performing the function specified by said function controller of the accessed control instruction,
(d) accessing said information for determining the completion of processing of the field and in response to the determination of the completion of processing of the field associated with the accessed control instruction, accessing, by use of the rearward pointer of said accessed control instruction, a prior control instruction, and substituting the forward pointer from said accessed control instruction for the forward pointer of said prior control instruction, whereby subsequent processing of said series of control instructions will effectively bypass the control instruction associated with the completed field; otherwise
(e) accessing by use of the forward pointer of the accessed control instruction, a further control instruction, and
(f) repeating operations (b) through (e) until processing of the presented scan line is terminated.

7. A process for dissecting into predetermined fields image data received from a document, comprising storing at a plurality of memory addresses a series of control instructions, one for each field of image data to be processed from within an image source area, each of said control instructions comprising a forward pointer to the control instruction for the next field to be processed, a rearward pointer to a prior control instruction in the series, an initial scan line number, and a function controller for specifying the function to be performed on the image data, and said series of control instructions being initialized such that the instructions in said series are ordered in the sequence of their contained initial scan line numbers, receiving successive scan lines of image data which collectively represent the image source area, together with an associated identifying sequence number for each scan line, and upon receipt of each scan line (a) accessing the first of said control instructions,
(b) comparing the scan line sequence number of the scan line presented with the initial scan line number of the accessed control instruction and terminating processing of the presented scan line if said initial scan line number is greater than said presented scan line sequence number, otherwise
(c) performing the functions specified by said function controller of the accessed control instruction,
(d) accessing by use of the forward pointer of the accessed control instruction, a further control instruction, and
(e) repeating operations (b) through (d) until processing of the presented scan line is terminated.

8. A process as defined in claim 7 including the further steps, performed upon the receipt of each scan line, of testing for the completion of processing of the field associated with the current control instruction and in response to the completion of the field, accessing, by use of the rearward pointer of the current instruction, a prior control instruction, and substituting the forward pointer from the current control instruction for the forward pointer of said prior control instruction, whereby subsequent processing of the series of control instructions will effectively bypass the control instruction for said completed field.

9. A process as defined in claim 8 including the further steps, performed in response to completion of the field, of substituting the rearward pointer from the current control instruction for the rearward pointer of the control instruction of the next active field.

10. A process for dissecting into predetermined fields image data received from a document, comprising storing at a plurality of memory addresses a series of control instructions, one for each field of image data to be processed from within an image source area, each of said control instructions comprising a forward pointer to the control instruction for the next field to be processed, a rearward pointer to a prior control instruction in the series, an initial scan line number, a function controller, and information by which the completion of processing of the associated field can be determined, said series of control instructions being initialized such that the instructions in said series are ordered in the sequence of their contained initial scan line numbers, receiving sucessive scan lines of image data which collectively represent the image source area, together with an associated identifying sequence number for each scan line, and upon receipt of each scan line (a) accessing the first of said control instructions,
(b) comparing the scan line sequence number of the scan line presented with the initial scan line number of the accessed control instruction and terminating processing of the presented scan line if said initial scan line number is greater than said presented scan line sequence number, otherwise
(c) performing the function specified by said function controller of the accessed control instruction,
(d) accessing said information for determining the completion of processing of the field and in response to the determination of the completion of processing of the field associated with the accessed control instruction, accessing, by use of the rearward pointer of said accessed control instruction, a prior control instruction, and substituting the forward pointer from said accessed control instruction for the forward pointer of said prior control instruction, whereby subsequent processing of said series of control instructions will effectively bypass the control instruction associated with the completed field, otherwise
(e) accessing by use of the forward pointer of the accessed control instruction, a further control instruction, and
(f) repeating operations (b) through (e) until processing of the presented scan line is terminated.

* * * * *